United States Patent Office 3,816,467
Patented June 11, 1974

3,816,467
4 - OXO - 4H - PYRANO[3,2 - b]BENZOFURAN-2-CARBOXYLIC ACIDS AND SALTS THEREOF
John B. Wright, Kalamazoo, Mich., assignor to The Upjohn Company, Kalamazoo, Mich.
No Drawing. Filed Oct. 24, 1972, Ser. No. 299,952
Int. Cl. C07d 7/24
U.S. Cl. 260—345.7
19 Claims

ABSTRACT OF THE DISCLOSURE

This invention relates to novel compounds and pharmaceutical compositions containing said compounds of the formula:

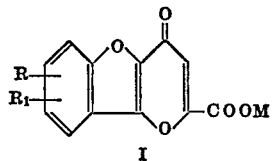

wherein R and $R_1$ are each selected from the group consisting of hydrogen, chloro, fluoro, trifluoromethyl, lower-alkoxy and lower-alkyl and M is selected from the group consisting of hydrogen, sodium, potassium, calcium, magnesium, and aluminum and amine cations.

The compounds (I) above are formulated with pharmaceutical carriers for oral and parenteral administration, with insufflation being the preferred method. The compositions are useful in the prophylactic treatment of sensitized humans and mammals for allergic and all anaphylactic reactions of a reagin and non-reagin mediated nature.

CROSS REFERENCE TO RELATED APPLICATIONS

None.

SUMMARY OF THE INVENTION

This invention relates to novel compounds, processes for their production and pharmaceutical compositions of said compounds and a process for the prophylactic treatment of allergic conditions employing said compositions.

The novel compositions comprise a novel compound of formula I in association with a pharmaceutical carrier.

DETAILED DESCRIPTION OF THE INVENTION

The novel compounds (I) and processes for their production are illustratively represented by the following sequence of formulae:

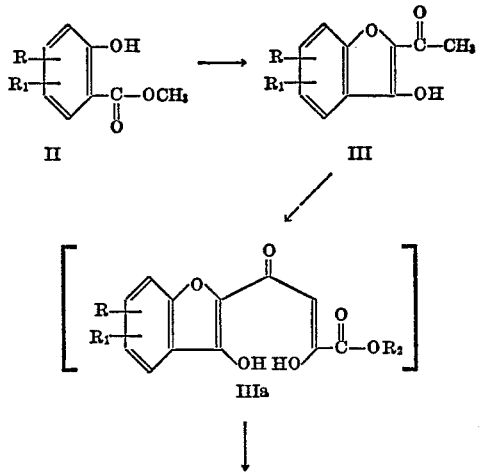

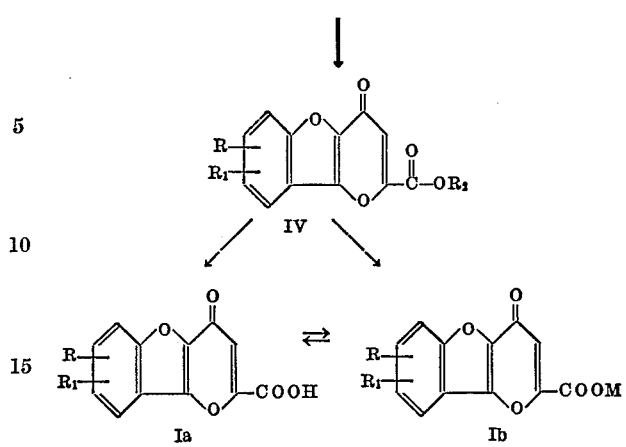

wherein R and $R_1$ have the meanings given above, $R_2$ is alkyl, and M is selected from the group consisting of sodium, potassium, calcium, magnesium, aluminum and amine cations such as tris(hydroxymethyl)methyl ammonium.

Structural formulae Ia and Ib are combined to form generic formula I, above.

In this application the term "lower-alkyl" means an alkyl radical of from 1 to 3 carbon atoms, inclusive, e.g., methyl, ethyl, propyl and isopropyl; the term "alkyl" means an alkyl radical of 1 to 6 carbon atoms, inclusive, i.e., methyl, ethyl, propyl, butyl, amyl, hexyl and isomeric forms thereof; and the term "lower-alkoxy" means an alkoxy radical of 1 to 3 carbon atoms inclusive, e.g., methoxy, ethoxy, propoxy and isopropoxy. The term amine cations includes cations of the amines ammonia, tris(hydroxymethyl)aminomethane, D-threo - 2 - amino-1-p-nitrophenyl-1,3-propanediol, N,N-bis(hydroxyethyl)piperazine, 2-amino-2-methyl - 1 - propanol, 2-amino-2-methyl-1,3-propanediol and 2,2'-bis(hydroxymethyl)-2,2', 2''-nitrilotriethanol and further amines including $H_2NR'$, $HNR'_2$ and $NR'_3$ wherein R' is selected from the group consisting of lower-alkyl from one to three carbon atoms, inclusive and —$CH_2CH_2OH$.

The compounds of this invention have anti-allergenic (especially anti-asthmatic) activity, inhibiting a positive Passive Cutaneous Anaphylactic (PCA) test induced by the rat immunochemical counterpart of human 1gE (Reagin) considered indicative of such activity. This Assay is described by Cmota, I., Ann. N.Y. Acad. Sci. *103*:264 (1963).

The starting materials of formula II of this invention are prepared by reacting the corresponding salicylic acid of the formula:

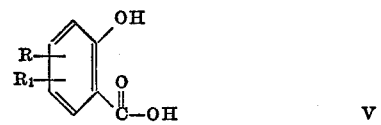

with excess methanol in the presence of concentrated sulfuric acid in accordance with methods known in the art, for example the mixture is heated under reflux from about 30 minutes to about 6 hours, cooled, neutralized with anhydrous sodium carbonate, and distilled to remove the methanol. The methyl ester II is recovered and purified by conventional methods, for example, water is added to the residue thus obtained and the desired methyl ester is extracted with a suitable immiscible organic solvent such as diethyl ether, methylene chloride, chloroform and the like and the solvent is removed to give the corresponding methyl salicylate II.

In carrying out the process of this invention for the production of the compounds of formula I the selected methyl salicylate II is taken up in a suitable organic solvent such as acetone and reacted with chloroacetone in the presence of sodium or potassium carbonate under reflux for a period of from 1 to 20 hours in accordance with the procedure of T. A. Geissman et al., J. Amer. Chem. Soc., 77, 1623–1627 (1955) to obtain the corresponding 3-hydroxy-2-benzofuranyl methyl ketone III, which is recovered from the reaction mixture by conventional methods, for example, the reaction mixture is diluted with water and acidified to give a precipitate which is collected on a filter, washed with water and purified if desired by recrystallization from a suitable solvent such as methanol, ethanol, isopropanol, water-ethanol, ligroin-ethanol and the like.

Compound III thus obtained is then reacted with a dialkyl oxylate of the formula

$$R_2O-\underset{\underset{O}{\|}}{C}-\underset{\underset{O}{\|}}{C}-OR_2 \qquad VI$$

wherein $R_2$ has the meaning given, above, in the presence of an alkali metal alkoxide such as sodium methoxide, sodium ethoxide, potassium t-butoxide and the like to obtain the alkali metal salt of the corresponding enol acrylate (IIIa). The reaction is preferably carried out under reflux conditions until the reaction is complete, a period of from about 1 to about 20 hours is generally sufficient. The enol acrylate (IIIa) is then subjected to dehydration under acidic conditions with a mineral acid such as hydrochloric acid, sulfuric acid, phosphoric acid and the like to obtain the corresponding alkyl-4-oxo-4H-pyrano[3,2-b]benzofuran-2-carboxylate (IV), which can be separated from the reaction mixture and purified by conventional methods.

Compound IV thus obtained is then subjected to hydrolysis under basic conditions, for example, with an aqueous solution of an alkali metal base (e.g., sodium hydroxide, potassium hydroxide, calcium hydroxide, sodium carbonate and the like) to obtain the compounds of formula Ib which are then converted to the corresponding free carboxylic acid (Ia) with a dilute acid, mineral acids such as hydrochloric acid, sulfuric acid, phosphoric acid, and the like are preferred.

Alternatively, the compounds of formula IV are subjected by hydrolysis under acid conditions, e.g., with a concentrated or dilute mineral acid to obtain the corresponding free acids of formula Ia, for example, the hydrolysis is carried out at ambient temperatures with a concentrated mineral acid or by refluxing with a dilute mineral acid.

The compounds of formula Ia, are converted to their corresponding salts of formula Ib by treating the free acid with a dilute base such as ammonium hydroxide, sodium hydroxide, potassium hydroxide, magnesium hydroxide, calcium hydroxide, tris(hydroxymethyl)methyl ammonia or the amines previously mentioned, sodium carbonate, potassium carbonate and the like to obtain the corresponding salt Ib.

The compounds of formula I (Ia and Ib) are recovered from the reaction mixture by conventional methods, for example, as shown in the examples.

The following preparations and examples are illustrative of the manner of making and using the invention and set forth the best mode contemplated by the inventor of carrying out his invention, but are not to be construed as limiting the scope thereof.

PREPARATION 1

Methyl 5-chlorosalicylate (II)

To a mixture of 490 ml. of methanol and 242 g. (1.4 moles) of 5-chlorosalicylic acid (V) is added cautiously 49 ml. of conc. sulfuric acid. The mixture is heated under reflux for about 4 hours, cooled to room temperature, and 93 g. of anhydrous sodium carbonate is added. Most of the methanol is then removed by distillation. To the residue thus obtained is added 1000 ml. of ether and 700 ml. of water. The mixture is shaken thoroughly and the ether layer is separated and washed several times with a 10% sodium bicarbonate solution. The ethereal extract is dried over anhydrous magnesium sulfate and the ether is removed to give 173.4 g. of methyl 5-chlorosalicylate (II), M.P. 44–46° C.

In like manner following the procedure of Preparation 1, other salicylic acids of formula V can likewise be converted to the corresponding methyl esters of formula II for example, the following are representative:

5-fluorosalicylic acid,
5-methoxysalicylic acid,
5-methylsalicylic acid,
3-chlorosalicylic acid,
4-chlorosalicylic acid,
3,5-dichlorosalicylic acid,
3,6-dichlorosalicylic acid,
3,4-dimethoxysalicylic acid,
3,5-dimethoxysalicylic acid,
4,5-dimethoxysalicylic acid,
4,6-dimethoxysalicylic acid,
3,4-dimethylsalicylic acid,
3,5-dimethylsalicylic acid,
3,6-dimethylsalicylic acid,
4,5-dimethylsalicylic acid,
4,6-dimethylsalicylic acid,
3,5-dipropylsalicylic acid,
4-ethoxysalicylic acid,
5-ethoxysalicylic acid,
3-ethylsalicylic acid,
5-ethylsalicylic acid,
4-fluorosalicylic acid,
3-isopropylsalicylic acid,
4-methoxysalicylic acid,
6-methoxysalicylic acid,
3-propylsalicylic acid,
5-propylsalicylic acid,
5-propoxysalicylic acid, and
4-trifluoromethylsalicylic acid ($\alpha,\alpha,\alpha$-trifluoro-2,4-cresotic acid) to respectively obtain:
    methyl 5-fluorosalicylate,
    methyl 5-methoxysalicylate,
    methyl 5-methylsalicylate,
    methyl 3-chlorosalicylate,
    methyl 4-chlorosalicylate,
    methyl 3,5-dichlorosalicylate,
    methyl 3,6-dichlorosalicylate,
    methyl 3,4-dimethoxysalicylate,
    methyl 3,5-dimethoxysalicylate,
    methyl 4,5-dimethoxysalicylate,
    methyl 4,6-dimethoxysalicylate,
    methyl 3,4-dimethylsalicylate,
    methyl 3,5-dimethylsalicylate,
    methyl 3,6-dimethylsalicylate,
    methyl 4,5-dimethylsalicylate,
    methyl 4,6-dimethylsalicylate,
    methyl 3,5-dipropylsalicylate,
    methyl 4-ethoxysalicylate,
    methyl 5-ethoxysalicylate,
    methyl 3-ethylsalicylate,
    methyl 5-ethylsalicylate,
    methyl 4-fluorosalicylate,
    methyl 3-isopropylsalicylate,
    methyl 4-methoxysalicylate,
    methyl 6-methoxysalicylate,
    methyl 3-propylsalicylate,
    methyl 5-propylsalicylate,
    methyl 5-propoxysalicylate, and
    methyl 4-trifluoromethylsalicylate.

EXAMPLE 1

3-hydroxy-2-benzofuranyl methyl ketone (III)

A mixture of 100 ml. of dry acetone 75 g. of anhydrous potassium carbonate, 50 g. of methyl salicylate (II) and 30.5 g. of chloroacetone is heated on a steam bath for about 5 hours. The mixture is then cooled, diluted with water, extracted with ether, and the aqueous phase is acidified with hydrochloric acid to give 8.0 g. of 3-hydroxy-2-benzofuranyl methyl ketone (III); a sample recrystallized from ligroin and dilute ethanol melts at 90–91° C.

EXAMPLE 2

5-chloro-3-hydroxy-2-benzofuranylmethyl ketone (III)

A mixture of 207 g. (1.5 moles) of potassium carbonate, 275 ml. of acetone, 173.4 g. (0.98 mole) of methyl 5-chlorosalicylate (II), 96 g. (0.9 mole) of chloroacetone is heated under reflux for about 13.5 hours then and allowed to stand overnight at room temperature. Water is then added and the mixture is extracted repeatedly with ether. To the aqueous layer is added acetic acid until neutral, and the precipitate thus obtained is removed by filtration and washed throughly with water. Recrystallization from ethanol-water gives 31.6 g. of 5-chloro-3-hydroxy-2-benzofuranylmethyl ketone (III), M.P. 149–150° C.

Anal. Calcd. for $C_{10}H_7ClO_3$: C, 57.02; H, 3.35; Cl, 16.83. Found: C, 57.26; H, 3.56; Cl, 16.82.

In the manner shown in Examples 1 and 2, above, other compounds of formula II, for example, those prepared and listed in Preparation 1, above, are converted to the corresponding 3-hydroxy-2-benzofuranyl methyl ketone of formula III, respectively, such as, 5-fluoro-3-hydroxy-2-benzofuranyl methyl ketone,
5-methoxy-3-hydroxy-2-benzofuranyl methyl ketone,
5-methyl-3-hydroxy-2-benzofuranyl methyl ketone,
7-chloro-3-hydroxy-2-benzofuranyl methyl ketone,
6-chloro-3-hydroxy-2-benzofuranyl methyl ketone,
5,7-dichloro-3-hydroxy-2-benzofuranyl methyl ketone,
4,7-dichloro-3-hydroxy-2-benzofuranyl methyl ketone,
6,7-dimethoxy-3-hydroxy-2-benzofuranyl methyl ketone,
5,7-dimethoxy-3-hydroxy-2-benzofuranyl methyl ketone,
5,6-dimethoxy-3-hydroxy-2-benzofuranyl methyl ketone,
4,6-dimethoxy-3-hydroxy-2-benzofuranyl methyl ketone,
6,7-dimethyl-3-hydroxy-2-benzofuranyl methyl ketone,
5,7-dimethyl-3-hydroxy-2-benzofuranyl methyl ketone,
4,7-dimethyl-3-hydroxy-2-benzofuranyl methyl ketone,
5,6-dimethyl-3-hydroxy-2-benzofuranyl methyl ketone,
4,6-dimethyl-3-hydroxy-2-benzofuranyl methyl ketone,
5,7-dipropyl-3-hydroxy-2-benzofuranyl methyl ketone,
6-ethoxy-3-hydroxy-2-benzofuranyl methyl ketone,
5-ethoxy-3-hydroxy-2-benzofuranyl methyl ketone,
7-ethyl-3-hydroxy-2-benzofuranyl methyl ketone,
5-ethyl-3-hydroxy-2-benzofuranyl methyl ketone,
6-fluoro-3-hydroxy-2-benzofuranyl methyl ketone,
7-isopropyl-3-hydroxy-2-benzofuranyl methyl ketone,
6-methoxy-3-hydroxy-2-benzofuranyl methyl ketone,
4-methoxy-3-hydroxy-2-benzofuranyl methyl ketone,
7-propyl-3-hydroxy-2-benzofuranyl methyl ketone,
5-propyl-3-hydroxy-2-benzofuranyl methyl ketone,
5-propoxy-3-hydroxy-2-benzofuranyl methyl ketone,
6-trifluoromethyl-3-hydroxy-2-benzofuranyl methyl ketone, and the like.

EXAMPLE 3

Ethyl 4-oxo-4H-pyrano[3,2-b]benzofuran-2-carboxylate (IV)

To a solution of 11.5 g. (0.498 mole) of sodium in 501 ml. of anhydrous ethanol is added 29.5 g. (0.166 mole) of 3-hydroxy-2-benzofuranyl methyl ketone (III). To the stirred mixture is then added dropwise, over the course of about 5 minutes, 73.5 g. (0.498 mole) of diethyl oxalate (IV). The mixture is heated under reflux for about 17 hours. A large excess of anhydrous ether is then added and the precipitate thus obtained (the sodium salt of IIIa) is removed by filtration. The solid thus obtained is added to 49 ml. of conc. hydrochloric acid and 200 ml. of ethanol, and the mixture is heated under reflux for about 1 hour. The mixture is cooled, the precipitate thus obtained is filtered, and the filtrate concentrated to dryness. The solid and residue are combined and dissolved in methylene chloride. The resulting solution is washed with a sodium bicarbonate solution, and then with water. The methylene chloride layer is dried over anhydrous magnesium sulfate and the solvent removed. The residue thus obtained is recrystallized from ethanol to give 6.78 g. of ethyl 4-oxo-4H-pyrano[3,2-b]benzofuran-2-carboxylate (IV) melting at 134–135° C.; recrystallization from ethanol raises the melting point to 135–136° C.

Anal. Calcd. for $C_{14}H_{10}O_5$: C, 65.12; H, 3.90. Found: C, 65.33; H, 3.95.

EXAMPLE 4

Ethyl 7-chloro-4-oxo-4H-pyrano[3,2-b]benzofuran-2-carboxylate (IV)

To a solution of 11.5 g. (0.498 mole) of sodium dissolved in 500 ml. of anhydrous ethanol is added 35.05 g. (0.166 mole) of 5-chloro-3-hydroxy-2-benzofuranyl methyl ketone (III). The solution is stirred and 73.5 g. (0.498 mole) of diethyloxalate (VI) is added dropwise over a period of about 5 minutes. The mixture is heated under reflux for about 5 hours. A large volume of ether is then added and the precipitate of the sodium salt of (IIIa) is removed by filtration. To the precipitate is added 200 ml. of anhydrous ethanol and 49 ml. of conc. hydrochloric acid. The resulting mixture is heated under reflux for about 1 hour, filtered hot and the inorganic precipitate is discarded. The filtrate is allowed to cool; the precipitate thus obtained is removed by filtration and the filtrate concentrated to dryness. The residue thus obtained and the precipitate are combined and shaken in a separatory funnel with a dilute sodium bicarbonate solution and ether. The ether extract is separated, dried over anhydrous magnesium sulfate and the ether is removed to give 3.68 g. of ethyl 7-chloro-4-oxo-4H-pyrano[3,2-b]benzofuran-2-carboxylate (IV), melting at 162–163° C.; recrystallization from ethanol does not change the melting point.

Anal. Calcd. for $C_{14}H_9ClO_5$: C, 57.45; H, 3.10; Cl, 12.12. Found: C, 57.51; H, 3.16; Cl, 12.15.

In the manner given in Examples 3 and 4, above, other 3-hydroxy-2-benzofuryl methyl ketones (III), for example those prepared and listed in Example 2, above, can be converted to the corresponding ethyl 4-oxo-4H-pyrano-[3,2-b]benzofuran-2-carboxylate of formula IV, respectively, such as:

ethyl 7-fluoro-4-oxo-4H-pyrano[3,2-b]benzofuran-2-carboxylate,
ethyl 7-methoxy-4-oxo-4H-pyrano[3,2-b]benzofuran-2-carboxylate,
ethyl 7-methyl-4-oxo-4H-pyrano[3,2-b]benzofuran-2-carboxylate,
ethyl 5-chloro-4-oxo-4H-pyrano[3,2-b]benzofuran-2-carboxylate,
ethyl 6-chloro-4-oxo-4H-pyrano[3,2-b]benzofuran-2-carboxylate,
ethyl 5,7-dichloro-4-oxo-4H-pyrano[3,2-b]benzofuran-2-carboxylate,
ethyl 5,8-dichloro-4-oxo-4H-pyrano[3,2-b]benzofuran-2-carboxylate,
ethyl 5,6-dimethoxy-4-oxo-4H-pyrano[3,2-b]benzofuran-2-carboxylate,
ethyl 5,7-dimethoxy-4-oxo-4H-pyrano[3,2-b]benzofuran-2-carboxylate, ethyl 6,7-dimethoxy-4-oxo-4H-pyrano[3,2-b]benzofuran-2-carboxylate,
ethyl 6,8-dimethoxy-4-oxo-4H-pyrano[3,2-b]benzofuran-2-carboxylate,
ethyl 5,6-dimethyl-4-oxo-4H-pyrano[3,2-b]benzofuran-2-carboxylate,
ethyl 5,7-dimethyl-4-oxo-4H-pyrano[3,2-b]benzofuran-2-carboxylate,
ethyl 5,8-dimethyl-4-oxo-4H-pyrano[3,2-b]benzofuran-2-carboxylate,
ethyl 6,7-dimethyl-4-oxo-4H-pyrano[3,2-b]benzofuran-2-carboxylate,
ethyl 6,8-dimethyl-4-oxo-4H-pyrano[3,2-b]benzofuran-2-carboxylate,
ethyl 5,7-dipropyl-4-oxo-4H-pyrano[3,2-b]benzofuran-2-carboxylate,
ethyl 6-ethoxy-4-oxo-4H-pyrano[3,2-b]benzofuran-2-carboxylate,
ethyl 7-ethoxy-4-oxo-4H-pyrano[3,2-b]benzofuran-2-carboxylate,
ethyl 5-ethyl-4-oxo-4H-pyrano[3,2-b]benzofuran-2-carboxylate,
ethyl 7-ethyl-4-oxo-4H-pyrano[3,2-b]benzofuran-2-carboxylate,
ethyl 6-fluoro-4-oxo-4H-pyrano[3,2-b]benzofuran-2-carboxylate,
ethyl 5-isopropyl-4-oxo-4H-pyrano[3,2-b]benzofuran-2-carboxylate,
ethyl 6-methoxy-4-oxo-4H-pyrano[3,2-b]benzofuran-2-carboxylate,
ethyl 8-methoxy-4-oxo-4H-pyrano[3,2-b]benzofuran-2-carboxylate,
ethyl 5-propyl-4-oxo-4H-pyrano[3,2-b]benzofuran-2-carboxylate,
ethyl 7-propyl-4-oxo-4H-pyrano[3,2-b]benzofuran-2-carboxylate,
ethyl 7-propoxy-4-oxo-4H-pyrano[3,2-b]benzofuran-2-carboxylate,
ethyl 6-trifluoromethyl-4-oxo-4H-pyrano[3,2-b]benzofuran-2-carboxylate, and the like.

In the same manner, following the procedure of Examples 3 and 4, above, the 3-hydroxy-2-benzofuryl methyl ketones of formula III can be converted to the other alkyl 4-oxo-4H-pyrano[3,2-b]benzofuran-2-carboxylates of formula IV, by substituting other alkyl oxylates (IV) in place of diethyl oxylate, for example the following conversions are representative, 3-hydroxy-2-benzofuranyl methyl ketone with methyl oxylate to obtain methyl 4-oxo-4H-pyrano[3,2-b]benzofuran-2-carboxylate;

5-chloro-3-hydroxy-2-benzofuranyl methyl ketone with dipropyl oxylate to obtain propyl 7-chloro-4-oxo-4H-pyrano[3,2-b]benzofuran-2-carboxylate;

5-fluoro - 3 - hydroxy - 2 - benzofuranyl methyl ketone with diisopropyl oxylate to obtain isopropyl 7-fluoro-4-oxo-4H-pyrano[3,2-b]benzofuran-2-carboxylate;

5 - methoxy - 3 - hydroxy - 2 - benzofuranyl methyl ketone with butyl oxylate to obtain butyl 7-methoxy-4-oxo-4H-pyrano[3,2-b]benzofuran-2-carboxylate;

5 - methyl - 3 - hydroxy - 2 - benzofuranyl methyl ketone with sec. butyl oxylate to obtain sec. butyl 7-methyl-4-oxo-4H-pyrano[3,2-b]benzofuran-2-carboxylate;

7-chloro - 3 - hydroxy - 2 - benzofuranyl methyl ketone with tert. butyl oxylate to obtain tert. butyl 5-chloro-4-oxo-4H-pyrano[3,2-b]benzofuran-2-carboxylate;

6-chloro - 3 - hydroxy - 2 - benzofuranyl methyl ketone with diamyl oxylate to obtain amyl 6-chloro - 4 - oxo- 4H-pyrano[3,2-b]benzofuran-2-carboxylate;

5,7-dichloro - 3 - hydroxy - 2 - benzofuranyl methyl ketone with dihexyl oxylate to obtain hexyl 5,7-dichloro-4-oxo-4H-pyrano[3,2-b]benzofuran - 2 - carboxylate; and the like.

EXAMPLE 5

4-oxo-4H-pyrano[3,2-b]benzofuran-2-carboxylic acid (Ia)

A solution of 1.26 g. (0.0049 mole) of ethyl-4-oxo-4H-pyrano[3,2-b]benzofuran - 2 - carboxylate (IV) in 20 ml. of 1% sodium hydroxide solution is stirred for 30 minutes. The solution is extracted with ether and the aqueous layer is acidified by the addition of dilute HCl. The resulting precipitate is removed by filtration and washed with water to give 1.16 g. of 4-oxo - 4H - pyrano[3,2-b]benzofuran-2-carboxylic acid (Ia), melting at 291° C. (dec.); which after recrystallization from a large volume of ethanol melts at 289° C. (dec.)

Anal. Calcd. for $C_{12}H_6O_5$: C, 62.62; H, 2.63. Found: C, 62.22; H, 2.56.

EXAMPLE 6

7-chloro-4-oxo-4H-pyrano[3,2-b]benzofuran-2-carboxylic acid (Ia)

Following the procedure of Example 5, above, 3.68 g. of ethyl 7 - chloro - 4 - oxo-4H-pyrano[3,2-b]benzofuran-2-carboxylate (IV) is hydrolyzed to give 1.09 g. (31% yield) of 7-chloro - 4 - oxo-4H-[pyrano[3,2-b]benzofuran-2-carboxylic acid (Ia), M.P. 268–270° C.

In the manner given in Example 5, above, other alkyl-4-oxo - 4H - pyrano[3,2-b]benzofuran-2-carboxylates of formula IV, for example the ethyl carboxylates prepared and listed in Example 4, above, can be converted to the corresponding 4-oxo - 4H - pyrano[3,2-b]benzofuran-2-carboxylic acids of formula Ia, respectively, such as:

7-fluoro-4-oxo-4H-pyrano[3,2-b]benzofuran-2-carboxylic acid,
7-methoxy-4-oxo-4H-pyrano[3,2-b]benzofuran-2-carboxylic acid,
7-methyl-4-oxo-4H-pyrano[3,2-b]benzofuran-2-carboxylic acid,
5-chloro-4-oxo-4H-pyrano[3,2-b]benzofuran-2-carboxylic acid,
6-chloro-4-oxo-4H-pyrano[3,2-b]benzofuran-2-carboxylic acid,
5,7-dichloro-4-oxo-4H-pyrano[3,2-b]benzofuran-2-carboxylic acid,
5,8-dichloro-4-oxo-4H-pyrano[3,2-b]benzofuran-2-carboxylic acid,
5,6-dimethoxy-4-oxo-4H-pyrano[3,2-b]benzofuran-2-carboxylic acid,
5,7-dimethoxy-4-oxo-4H-pyrano[3,2-b]benzofuran-2-carboxylic acid,
6,7-dimethoxy-4-oxo-4H-pyrano[3,2-b]benzofuran-2-carboxylic acid,
6,8-dimethoxy-4-oxo-4H-pyrano[3,2-b]benzofuran-2-carboxylic acid,
5,6-dimethyl-4-oxo-4H-pyrano[3,2-b]benzofuran-2-carboxylic acid,
5,7-dimethyl-4-oxo-4H-pyrano[3,2-b]benzofuran-2-carboxylic acid,
5,8-dimethyl-4-oxo-4H-pyrano[3,2-b]benzofuran-2-carboxylic acid,
6,7-dimethyl-4-oxo-4H-pyrano[3,2-b]benzofuran-2-carboxylic acid,
6,8-dimethyl-4-oxo-4H-pyrano[3,2-b]benzofuran-2-carboxylic acid,
5,7-dipropyl-4-oxo-4H-pyrano[3,2-b]benzofuran-2-carboxylic acid,
6-ethoxy-4-oxo-4H-pyrano[3,2-b]benzofuran-2-carboxylic acid,
7-ethoxy-4-oxo-4H-pyrano[3,2-b]benzofuran-2-carboxylic acid,
5-ethyl-4-oxo-4H-pyrano[3,2-b]benzofuran-2-carboxylic acid,
7-ethyl-4-oxo-4H-pyrano[3,2-b]benzofuran-2-carboxylic acid,
6-fluoro-4-oxo-4H-pyrano[3,2-b]benzofuran-2-carboxylic acid, 5-isopropyl-4-oxo-4H-pyrano[3,2-b]benzofuran-2-carboxylic acid,
6-methoxy-4-oxo-4H-pyrano[3,2-b]benzofuran-2-carboxylic acid,
8-methoxy-4-oxo-4H-pyrano[3,2-b]benzofuran-2-carboxylic acid,
5-propyl-4-oxo-4H-pyrano[3,2-b]benzofuran-2-carboxylic acid,
7-propyl-4-oxo-4H-pyrano[3,2-b]benzofuran-2-carboxylic acid,
7-propoxy-4-oxo-4H-pyrano[3,2-b]benzofuran-2-carboxylic acid,
6-trifluoromethyl-4-oxo-4H-pyrano[3,2-b]benzofuran-2-carboxylic acid, and the like.

EXAMPLE 7

4-oxo-4H-pyrano[3,2-b]benzofuran-2-carboxylic acid, sodium salt (Ib)

An aqueous solution of 0.5 g. 4-oxo-4H-pyrano[3,2-b]benzofuran-2-carboxylic acid (Ia) is treated with molar equivalent amount of sodium hydroxide to obtain an aqueous solution of 4-oxo-4H-pyrano[3,2-b]benzofuran-2-carboxylic acid, sodium salt (Ib), which is recovered in solid form by freeze drying.

EXAMPLE 8

7-chloro-4-oxo-4H-pyrano[3,2-b]benzofuran-2-carboxylic acid, sodium salt (Ib)

Following the procedure of Example 7, above, 7-chloro-4-oxo-4H-pyrano[3,2-b]benzofuran-2-carboxylic acid (Ia) is converted to 7-chloro-4-oxo-4H-pyrano[3,2-b]benzofuran-2-carboxylic acid sodium salt (Ib).

In the same manner, following the procedure of Example 7, the other carboxylic acids of formula Ia, for example those prepared and listed in Example 6, above, are likewise converted to the corresponding carboxylic acid sodium salts of formula Ib, respectively, such as:

7-fluoro-4-oxo-4H-pyrano[3,2-b]benzofuran-2-carboxylic acid, sodium salt;
7-methoxy-4-oxo-4H-pyrano[3,2-b]benzofuran-2-carboxylic acid, sodium salt;
7-methyl-4-oxo-4H-pyrano[3,2-b]benzofuran-2-carboxylic acid, sodium salt;
5-chloro-4-oxo-4H-pyrano[3,2-b]benzofuran-2-carboxylic acid, sodium salt;
6-chloro-4-oxo-4H-pyrano[3,2-b]benzofuran-2-carboxylic acid, sodium salt;
5,7-dichloro-4-oxo-4H-pyrano[3,2-b]benzofuran-2-carboxylic acid, sodium salt;
5,8-dichloro-4-oxo-4H-pyrano[3,2-b]benzofuran-2-carboxylic acid, sodium salt;
5,6-dimethoxy-4-oxo-4H-pyrano[3,2-b]benzofuran-2-carboxylic acid, sodium salt;
5,7-dimethoxy-4-oxo-4H-pyrano[3,2-b]benzofuran-2-carboxylic acid, sodium salt;
6,7-dimethoxy-4-oxo-4H-pyrano[3,2-b]benzofuran-2-carboxylic acid, sodium salt;
6,8-dimethoxy-4-oxo-4H-pyrano[3,2-b]benzofuran-2-carboxylic acid, sodium salt;
5,6-dimethyl-4-oxo-4H-pyrano[3,2-b]benzofuran-2-carboxylic acid, sodium salt;
5,7-dimethyl-4-oxo-4H-pyrano[3,2-b]benzofuran-2-carboxylic acid, sodium salt;
5,8-dimethyl-4-oxo-4H-pyrano[3,2-b]benzofuran-2-carboxylic acid, sodium salt;
6,7-dimethyl-4-oxo-4H-pyrano[3,2-b]benzofuran-2-carboxylic acid, sodium salt;
6,8-dimethyl-4-oxo-4H-pyrano[3,2-b]benzofuran-2-carboxylic acid, sodium salt;
5,7-dipropyl-4-oxo-4H-pyrano[3,2-b]benzofuran-2-carboxylic acid, sodium salt;
6-ethoxy-4-oxo-4H-pyrano[3,2-b]benzofuran-2-carboxylic acid, sodium salt;
7-ethoxy-4-oxo-4H-pyrano[3,2-b]benzofuran-2-carboxylic acid, sodium salt;
5-ethyl-4-oxo-4H-pyrano[3,2-b]benzofuran-2-carboxylic acid, sodium salt;
7-ethyl-4-oxo-4H-pyrano[3,2-b]benzofuran-2-carboxylic acid, sodium salt;
6-fluoro-4-oxo-4H-pyrano[3,2-b]benzofuran-2-carboxylic acid, sodium salt;
5-isopropyl-4-oxo-4H-pyrano[3,2-b]benzofuran-2-carboxylic acid, sodium salt;
6-methoxy-4-oxo-4H-pyrano[3,2-b]benzofuran-2-carboxylic acid, sodium salt;
8-methoxy-4-oxo-4H-pyrano[3,2-b]benzofuran-2-carboxylic acid, sodium salt;
5-propyl-4-oxo-4H-pyrano[3,2-b]benzofuran-2-carboxylic acid, sodium salt;
7-propyl-4-oxo-4H-pyrano[3,2-b]benzofuran-2-carboxylic acid, sodium salt;
7-propoxy-4-oxo-4H-pyrano[3,2-b]benzofuran-2-carboxylic acid, sodium salt
6-trifluoromethyl-4-oxo-4H-pyrano[3,2-b]benzofuran-2-carboxylic acid, sodium salt;

and the like.

EXAMPLE 9

4-oxo-4H-pyrano[3,2-b]benzofuran-2-carboxylic acid, tris(hydroxymethyl)methylammonium salt (Ib)

Following the procedure of Example 7, above, 4-oxo-4H-pyrano[3,2-b]benzofuran-2-carboxylic acid (Ia) is treated with a molar equivalent amount of tris(hydroxymethyl)methylamine to obtain 4-oxo-4H-pyrano[3,2-b]benzofuran-2-carboxylic acid, tris(hydroxymethyl)methyl ammonium salt (Ib).

EXAMPLE 10

7-chloro-4-oxo-4H-pyrano[3,2-b]benzofuran-2-carboxylic acid, tris(hydroxymethyl)methyl ammonium salt (Ib)

Following the procedure of Example 7, above, 7-chloro-4-oxo-4H-pyrano[3,2-b]benzofuran-2-carboxylic acid (Ia) is treated with a molar equivalent amount of tris(hydroxymethyl)methyl amine to obtain 7-chloro-4-oxo-4H-pyrano[3,2-b]benzofuran-2-carboxylic acid, tris(hydroxymethyl)methyl ammonium salt.

In the same manner, following the procedure of Examples 9 and 10, above the other carboxylic acids of formula Ia, for example, those prepared and listed in Example 6, above, are likewise converted to the corresponding tris(hydroxymethyl)methyl ammonium salts, for example those compounds corresponding to the sodium salts, prepared and listed in Example 8, above.

Following the procedure of Example 7, above, the potassium, calcium, magnesium, and ammonium salts of formula Ib can likewise be prepared from the corresponding free carboxylic acids of formula Ia, for example the following are representative, 4-oxo-4H-pyrano[3,2-b]benzofuran-2-carboxylic acid with potassium hydroxide to obtain 4-oxo-4H-pyrano[3,2-b]benzofuran-2-carboxylic acid, potassium salt;

7-chloro-4-oxo-4H-pyrano[3,2-b]benzofuran-2-carboxylic acid with calcium hydroxide to obtain 7-chloro-4-oxo-4H-pyrano[3,2-b]benzofuran-2-carboxylic acid, calcium salt;

7-fluoro-4-oxo-4H-pyrano[3,2-b]benzofuran-2-carboxylic acid with magnesium hydroxide to obtain 7-fluoro-4-oxo-4H-pyrano[3,2-b]benzofuran-2-carboxylic acid, magnesium salt;

7-methoxy-4-oxo-4H-pyrano[3,2-b]benzofuran-2-carboxylic acid with ammonium hydroxide to obtain 7-methoxy-4-oxo-4H-pyrano[3,2-b]benzofuran-2-carboxylic acid, ammonium salt; and the like.

The compositions of the present invention are presented for administration to humans and animals in unit dosage forms, such as tablets, capsules, pills, powders, granules, suppositories, eye drops, sterile parenteral solutions or suspensions, and oral solutions or suspensions, and oil-in-water and water-in-oil emulsions containing suitable quantities of the compound of formula I. The preferred method of administration is by means of an aerosol or powder for insufflation.

For oral administration either solid or fluid unit dosage forms can be prepared. For preparing solid compositions such as tablets, the compound of formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petroleum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with a syrup vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The preferred compositions are those adapted for inhalation into the lung and containing a water soluble form of a compound of the formula I. For treatment of allergic conditions compositions adapted for contact with nasal linings are preferred.

Compositions for inhalation are of three basic types: (1) a powder mixture preferably micro-pulverized; (2) an aqueous solution to be sprayed with a nebulizer; and (3) an aerosol with volatile propellant in a pressurized container.

The powders are quite simply prepared by mixing a compound of the formula with a solid base which is compatible with lung tissue, preferably lactose. The powders are packaged in a device adapted to emit a measured amount of powder when inhaled through the mouth.

Aqueous solutions are prepared by dissolving the compound of the formula I in water and adding salt to provide an isotonic solution and buffering to a pH compatible with inhalation. The solutions are dispersed in a spray device or nebulizer and sprayed into the mouth while inhaling.

Aerosols are prepared by dissolving a compound of the formula I in water or ethanol and mixing with a volatile propellant and placing in a pressurized container having a metering valve to release a predetermined amount of material.

The liquefied propellant employed is one which has a boiling point below 65° F. at atmospheric pressure. For use in compositions intended to produce aerosols for medicinal use, the liquefied propellant should be non-toxic. Among the suitable liquefied propellants which may be employed are the lower alkanes containing up to five carbon atoms, such as butane and pentane, or a lower alkyl chloride, such as methyl, ethyl, or propyl chlorides. The most suitable liquefied propellants are the fluorinated and fluorochlorinated lower alkanes such as are sold under the trademarks "Freon" and "Genetron." Mixtures of the above-mentioned propellants may suitably be employed. Examples of these propellants are dichlorodifluoromethane ("Freon 12"), dichlorotetrafluoroethane ("Freon 114"), trichloromonofluoromethane ("Freon 11"), dichloromonofluoromethane ("Freon 21"), monochlorodifluoromethane ("Freon 22"), trichlorotrifluoroethane ("Freon 113"), difluoroethane ("Genetron 142–A") and monochlorotrifluoromethane ("Freon 13").

The term "unit dosage form," as used in the specification and claims, refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonfuls, tablespoonfuls, dropperfuls, ampuls, vials, aerosols with metered discharges, segregated multiples of any of the foregoing, and other forms as herein described.

An effective but non-toxic quantity of the compound is employed in treatment. The dosage of the compound for treatment depends on the route of administration and the potency of the particular compound. Generally, a dosage range of about 0.1 to 30 mg./kg./day can be administered. A dosage schedule of from about 2 to about 300 mg. of compound in a single dose administered parenterally or by inhalation in the compositions of this invention are effective for preventing allergy attacks. Preferably, the single dose is from about 10 to about 150 mg. of compound. The oral and rectal dose is from about 5 to about 500 mg. in a single dose. Preferably, the single dose is from about 10 to about 300 mg. of compound. The dosage to be administered can be repeated up to four times daily. However, when it is necessary to repeat treatment, a preferred dosage schedule reduces the secondary treatment dosage to from about 0.5 percent to about 20 percent of the above dosages, more specifically, from about 1 to about 10 percent of the above dosages. In this manner, a state of allergy prophylaxis can be maintained. The reduced dosage is taken until that dosage no longer provides effective protection. At that time, the larger dosage is repeated followed by the reduced dosage. An example of such a dosage schedule is the following: An asthmatic individual insufflates 10 mg. of a compound of formula I, of this invention, for example, 4-oxo-4H-pyrano[3,2-b]benzofuran - 2 - carboxylic acid or a salt thereof. Four hours later the individual insufflates 0.5 mg. of the same compound and every four to six hours thereafter insufflates 0.5 mg. of the same compound until effective asthma prophylaxis is not provided. The individual then insufflates 10 mg. of the same compound, then reduces the insufflation dosage to 0.5 gm. four to six hours later. The dosage schedule continues in this manner.

The administration of the compositions of the present invention to humans and animals provides a method for the prophylactic treatment of allergy or all anaphylactic reactions of a reagin or a non-reagin mediated nature. That is to say, these compositions when administered to a sensitized individual prior to the time that the individual comes into contact with substances (antigens) to which he is allergic, will prevent the allergic reaction which would otherwise occur.

For example, the process can be used for prophylactic treatment of such chronic conditions as bronchial asthma, allergic rhinitis, food allergy, hay fever, urticaria, auto-immune diseases, exercise induced asthma, stress induced asthma, and bird fancier's disease.

EXAMPLE 11

Tablets

A lot of 10,000 tablets, each containing 200 mg. of 4-oxo-4H-pyrano[3,2-b]benzofuran-2-carboxylic acid (Ia) is prepared from the following types and amounts of ingredients:

| | Gm. |
|---|---|
| 4-oxo-4H-pyrano-[3,2-b]benzofuran-2-carboxylic acid (Ia), micronized | 2000 |
| Dicalcium phosphate | 1300 |
| Methyl cellulose, U.S.P. (15 cps.) | 60 |
| Talc | 150 |
| Corn starch | 300 |
| Calcium stearate | 20 |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and stearate, and compressed into tablets.

These tablets are useful in preventing hay fever attacks at a dose of 1 tablet every four to six hours.

EXAMPLE 12

Capsules

One thousand two-piece hard gelatin capsules, each containing 100 mg. of 4-oxo-4H-pyrano[3,2-b]benzofuran-2-carboxylic acid (Ia) are prepared from the following types and amounts of ingredients:

| | Gm. |
|---|---|
| 4-oxo-4H-pyrano[3,2-b]benzofuran-2-carboxylic acid (Ia), micronized | 100 |
| Dicalcium phosphate | 50 |
| Talc | 15 |
| Magnesium stearate | 1.5 |

The ingredients are mixed well and filled into capsules of the proper size.

Capsules so prepared are useful in preventing attacks of bronchial asthma at a dose of one capsule every four to six hours.

EXAMPLE 13

Tablets

One thousand tablets, each containing 50 mg. of 4-oxo-4H-pyrano[3,2-b]benzofuran-2-carboxylic acid (Ia) are prepared from the following types and amounts of ingredients:

| | Gm. |
|---|---|
| 4-oxo-4H-pyrano[3,2-b]benzofuran-2-carboxylic acid (Ia), finely powdered | 50 |
| Microcrystalline cellulose NF | 428 |
| Starch | 100 |
| Magnesium stearate powder | 5 |

The ingredients are screened and blended together and pressed into tablets.

The tablets are useful to protect against food allergy at a dose of 1 tablet before meals.

EXAMPLE 14

Intramuscular injection

A sterile preparation suitable for intramuscular injection and containing 5 mg. of 4-oxo-4H-pyrano[3,2-b]benzofuran-2-carboxylic acid (Ia) in each milliliter is prepared from the following ingredients:

| 4-oxo-4H-pyrano[3,2-b]benzofuran-2-carboxylic acid (Ia) | gm | 5 |
|---|---|---|
| Benzyl benzoate | ml | 200 |
| Methylparaben | gm | 1.5 |
| Propylparaben | gm | 0.5 |
| Cottonseed oil, q.s. 1,000 ml. | | |

One milliliter of this sterile preparation is injected for prophylactic treatment of allergic rhinitis.

EXAMPLE 15

Aqueous solution

Six hundred ml. of an aqueous solution containing 20 mg. per ml. of the 4-oxo-4H-pyrano[3,2-b]benzofuran-2-carboxylic acid, tris(hydroxymethyl)methyl ammonium (THAM) salt (Ib) is prepared as follows:

| | Gm. |
|---|---|
| 4-oxo-4H-pyrano[3,2-b]benzofuran-2-carboxylic acid, tris(hydroxymethyl)-methyl ammonium (THAM) salt (Ib) | 12 |
| Sodium chloride | 5 |
| Water for injection, q.s. 600 ml. | |

The THAM salt and sodium chloride are dissolved in sufficient water to make 600 ml. and sterile filtered.

The solution is placed in nebulizers designed to deliver 0.25 ml. of solution per spray.

The solution is inhaled into the lungs every four to six hours for prevention of asthmatic attacks.

EXAMPLE 16

Powder for insufflation

A powder mixture consisting of 2.5 grams of tris(hydroxymethyl)aminomethane salt of 4-oxo-4H-pyrano[3,2-b]benzofuran-2-carboxylic acid (Ib) and sufficient lactose to make 5 grams of mixture is micropulverized and placed in an insufflator designed to deliver 25 mg. of powder per dose.

The powder is inhaled into the lungs for prevention of asthmatic atacks.

EXAMPLE 17

Aerosol

Twelve grams of an aerosol composition is prepared from the following ingredients:

| | Gm. |
|---|---|
| 4-oxo-4H-pyrano[3,2-b]benzofuran-2-carboxylic acid, tris(hydroxymethyl)methyl ammonium (THAM) salt (Ib) | 2.5 |
| Absolute ethanol | 4.620 |
| Freon 12 | 1.22 |
| Freon 114 | 3.66 |

The THAM salt is dissolved in the ethanol and chilled to —30° C. and added to the chilled Freons. The twelve grams of composition are added to a 13 cc. plastic coated bottle and capped with a metering valve. The metering valve releases 80 mg. of composition in an aerosol.

The aerosol is inhaled every four to six hours for prevention of asthmatic attacks.

In individuals who require continued treatment, the dosages of Examples 11 through 17, above are given initially (priming dose) and each succeeding administration of the drug is given in the same dosage form at ⅟₁₀ to ⅟₁₀₀ of the initial dosage (maintenance dose). This maintenance dosage is continued until effective allergy prophylaxis is no longer obtained. The initial dose (priming dose) is then administered once more, followed again by the maintenance dosages.

Examples of maintenance dose preparations are exemplified by Examples 18 through 21 which follow.

EXAMPLE 18

Tablets

A lot of 10,000 tablets, each containing 2 mg. of 4-oxo-4H-pyrano[3,2-b]benzofuran-2-carboxylic acid (Ia) is prepared from the following types and amounts of ingredients:

| | Gm. |
|---|---|
| 4-oxo-4H-pyrano[3,2-b]benzofuran - 2 - carboxylic acid (Ia), micronized | 20 |
| Dicalcium phosphate | 1,500 |
| Methylcellulose, U.S.P. (15 cps.) | 60 |
| Talc | 150 |
| Corn starch | 200 |
| Magnesium stearate | 12 |

The compound and dicalcium phosphate are mixed well, granulated with 7.5 percent solution of methylcellulose in water, passed through a No. 8 screen and dried carefully. The dried granules are passed through a No. 12 screen, mixed throughly with the talc, starch and magnesium stearate, and compressed into tablets.

These tablets are useful in preventing hay fever attacks at a dose of one maintenance dose tablet every four hours following the higher initial priming dose.

EXAMPLE 19

Capsules

One thousand two-piece hard gelatin capsules, each containing 1 mg. of 4-oxo-4H-pyrano[3,2-b]benzofuran-2-carboxylic acid (Ia) are prepared from the following types and amounts of ingredients:

| | Gm. |
|---|---|
| 4-oxo-4H-pyrano[3,2-b]benzofuran - 2 - carboxylic acid (Ia), micronized | 1 |
| Dicalcium phosphate | 100 |
| Talc | 20 |
| Magnesium stearate | 2 |

The ingredients are mixed well and filled into capsules of the proper size.

Capsules so prepared are useful in preventing attacks of bronchial asthma at a dose of one maintenance dose capsule every six hours following the higher initial priming dose.

EXAMPLE 20

Intramuscular injection

A sterile preparation suitable for intramuscular injection and containing 0.5 mg. of 4-oxo-4H-pyrano[3,2-b]benzofuran-2-carboxylic acid (Ia) in each milliliter is prepared from the following ingredients:

| | | |
|---|---|---|
| 4-oxo-4H-pyrano[3,2-b]benzofuran - 2 - carboxylic acid (Ia) | gm | 0.5 |
| Benzyl benzoate | ml | 200 |
| Methylparaben | gm | 1.5 |
| Propylparaben | gm | 0.5 |
| Cottonseed oil, q.s. 1,000 ml. | | |

One milliliter of the maintenance dose is given following the initial higher priming dose every 4 to 12 hours for prophylactic treatment of allergic rhinitis.

EXAMPLE 21

Powder for insufflation

A powder mixture consisting of 125 milligrams of 4-oxo-4H-pyrano[3,2-b]benzofuran-2-carboxylic acid (Ia) and sufficient lactose to make 5 grams of mixture is micropulverized and 50 mg. of powder placed in a capsule designed for placement in an insufflator to deliver 1.25 mg. of active material per dose.

A priming dose capsule is used first and then a maintenance dose capsule three times a day for prevention of asthmatic attacks.

In the same manner, following the procedures of Examples 11 through 21, inclusive, above, 7-chloro-4-oxo-4H-pyrano[3,2-b]benzofuran-2-carboxylic acid, and the sodium and tris(hydroxymethyl)methyl ammonium salts thereof can be substituted in place of 4-oxo-4H-pyrano[3,2-b]benzofuran-2-carboxylic acid, and the sodium and tris(hydroxymethyl)methyl ammonium salts thereof.

Likewise, following the procedures of Examples 11 through 21, inclusive, above, allowing for the differing solubilition of the compounds and the activity of the particular compound as measured, for example, by the in vivo rat passive cutaneous anaphylaxis assay, compositions are similarly prepared by substituting other compounds of formula I, in place of 4-oxo-4H-pyrano[3,2-b]benzofuran-2-carboxylic acid and the sodium and tris(hydroxymethyl)-methyl ammonium salts thereof in each of Examples 11 through 21, for example, the other carboxylic acids of formula Ia, prepared and listed in Example 6, above, and the like; and the other carboxylic acid salts of formula Ib prepared and listed in Examples 8, 9 and 10, above, and the like.

EXAMPLE 22

Rat passive cutaneous anaphylaxis assay

Female Sprague-Dawley 250 gm. rats are skin-sensitized with rat anti-ovalbumin homocytotropic antibody that is heat labile and has a passive cutaneous anaphylaxis titer of 1:128. After a 72-hour latency period, the animals are challenged i.v. with 4 mg. ovalbumin (OA) +5 mg. Evans blue dye and the test compound. Thirty minutes later the extravascular bluing that results from antigen antibody combination at the skin site is read. Antibody dilutions are used such that in control animals a 4 mm. spot is the lowest detectable spot, and 4 or 5 lower dilutions are used to give a range of antibody in each animal. Four to five animals are used for each variable in the experiment. Percent inhibition of the PCA assay is calculated by comparing the spot scores of treated rats with the spot scores of control rats. The spot score is the total number of detectable spots over the number of animals.

The inhibiting dose₅₀ for 4-oxo-4H-pyrano[3,2-b]benzofuran-2-carboxylic acid when given i.v. is 5 mg./kg.

What is claimed is:

1. A compound of the formula:

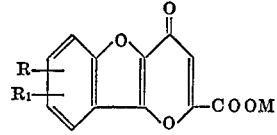

wherein R and R₁ are each selected from the group consisting of hydrogen, chloro, fluoro, trifluoromethyl, lower-alkoxy of 1 to 3 carbon atoms, inclusive, and lower-alkyl of 1 to 3 carbon atoms, inclusive, and M is selected from the group consisting of hydrogen, sodium, potassium, calcium, magnesium, aluminum, and an amine cation selected from the group consisting of ammonia, tris(hydroxymethyl)aminomethane, D - threo-2-amino-1-p-nitrophenyl-1,3-propanediol, N,N-bis(hydroxyethyl)piperazine, 2-amino - 2 - methyl-1-propanol, 2-amino-2-methyl-1,3-propanediol and 2,2'-bis(hydroxymethyl)-2,2',2''-nitrilotriethanol and amines of the formulae: H₂NR', HNR'₂ and NR'₃ wherein R' is selected from the group consisting of lower-alkyl from one to three carbon atoms, inclusive and —CH₂CH₂OH.

2. 4 - oxo - 4H-pyrano[3,2-b]benzofuran-2-carboxylic acid, the compound of claim 1 wherein R, R₁ and M are each hydrogen.

3. 7 - chloro - 4-oxo-4H-pyrano[3,2-b]benzofuran-2-carboxylic acid, the compound of claim 1 wherein R and M are each hydrogen and R₁ is 7-chloro.

4. 4 - oxo - 4H - pyrano[3,2-b]benzofuran-2-carboxylic acid, sodium salt, the compound of claim 1 wherein R and R₁ are each hydrogen and M is sodium.

5. 7 - chloro - 4 - oxo - 4H - pyrano[3,2-b]benzofuran-2-carboxylic acid, sodium salt, the compound of claim 1, wherein R is hydrogen, R₁ is 7-chloro and M is sodium.

6. 4 - oxo - 4H - pyrano[3,2-b]benzofuran-2-carboxylic acid, tris(hydroxymethyl)methyl ammonium salt, the compound of claim 1 wherein R and R₁ are each hydrogen and M is tris(hydroxymethyl)methyl ammonium.

7. 7 - chloro - 4 - oxo - 4H - pyrano[3,2-b]benzofuran-2-carboxylic acid, tris(hydroxymethyl)methyl ammonium salt, the compound of claim 1 wherein R is hydrogen R₁ is 7-chloro and M is tris(hydroxymethyl)methyl ammonium.

8. A compound of the formula:

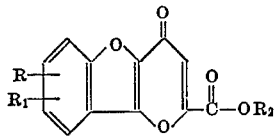

wherein R and R₁ are each selected from the group consisting of hydrogen, chloro, fluoro, trifluoromethyl, loweralkoxy of 1 to 3 carbon atoms, inclusive, and lower-alkyl of 1 to 3 carbon atoms, inclusive, and R₂ is alkyl of 1 to 6 carbon atoms, inclusive.

9. Ethyl 4 - oxo - 4H - pyrano[3,2-b]benzofuran-2-carboxylate, the compound of claim 8 wherein R and R₁ are each hydrogen and R₂ is ethyl.

10. Ethyl 7 - chloro - 4 - oxo - 4H - pyrano[3,2-b]benzofuran - 2 - carboxylate, the compound of claim 8 wherein R is hydrogen, R₁ is 7-chloro and R₂ is ethyl.

11. The process for the production of an alkyl 4-oxo-4H - pyrano[3,2-b]benzofuran - 2 - carboxylate of the formula:

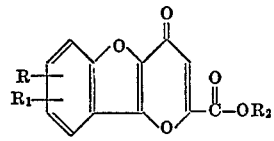

wherein R and R₁ are each selected from the group consisting of hydrogen, chloro, fluoro, trifluoromethyl, loweralkoxy of 1 to 3 carbon atoms, inclusive, and lower-alkyl of 1 to 3 carbon atoms inclusive and R₂ is alkyl of 1 to 6 carbon atoms inclusive, which comprises reacting a compound of the formula:

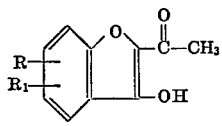

wherein R and R₁ have the meanings given, above with a dialkyl oxylate of the formula:

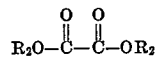

wherein R₂ has the meaning given, above, in the presence of an alkali metal alkoxide to obtain the corresponding alkali metal salt of an enol acrylate of the formula:

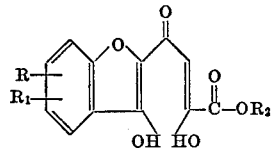

wherein R₂ has the meaning given, above, and treating the enol acylate thus obtained with a mineral acid to obtain the corresponding alkyl 4-oxo-4H-pyrano[3,2-b]benzofuran-2-carboxylate.

12. The process of claim 11 for the production of ethyl 4 - oxo - 4H - pyrano[3,2-b]benzofuran-2-carboxylate, wherein the starting material is 3-hydroxy-2-benzofuranyl methyl ketone and the alkyl oxylate is diethyloxylate.

13. The process of claim 11 for the production of ethyl 7 - chloro - 4 - oxo - 4H - pyrano[3,2-b]benzofuran-2-carboxylate, wherein the starting material is 5-chloro-3-hydroxy-2-benzofuranyl methyl ketone and the alkyl oxylate is diethyloxylate.

14. The process for the production of a 4-oxo-4H-pyrano[3,2-b]benzofuran - 2 - carboxylic acid of the formula:

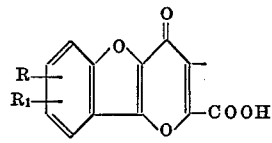

wherein R and R₁ are each selected from the group consisting of hydrogen, chloro, fluoro, trifluoromethyl, loweralkoxy of 1 to 3 carbon atoms, inclusive, and lower-alkyl of 1 to 3 carbon atoms, inclusive, which comprises:
(1) reacting a compound of the formula:

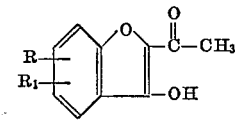

wherein R and R₁ have the meanings given, above with a dialkyl oxylate of the formula:

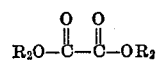

wherein R₂ is alkyl of 1 to 6 carbon atoms, inclusive, in presence of an alkali metal alkoxide to obtain the corresponding alkali metal salt of an enol acylate of the formula:

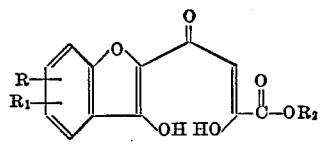

wherein R₂ has the meaning given, above;
(2) treating the enol acylate thus obtained with a mineral acid to obtain the corresponding alkyl 4-oxo-4H-pyrano[3,2-b]benzofuran - 2 - carboxylate of the formula:

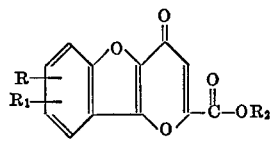

wherein R, R₁ and R₂ have the meanings given, above;
(3) subjecting the carboxylate thus obtained to hydrolysis with an aqueous alkali metal base to obtain the corresponding 4 - oxo - 4H - pyrano[3,2-b]benzofuran-2-carboxylic acid, alkali metal salt, and
(4) acidifying the salt thus obtained to produce the corresponding free carboxylic acid.

15. The process of claim 14 for the production of 4-oxo-4H-pyrano[3,2-b]benzofuran - 2 - carboxylic acid, wherein the starting material is 3-hydroxy-2-benzofuranyl methyl ketone.

16. The process of claim 14 for the production of 7-chloro - 4H - pyrano[3,2-b]benzofuran-2-carboxylic acid, wherein the starting material is 5 - chloro - 3 - benzofuranyl methyl ketone.

17. The process for the production of a 4-oxo-4H-pyrano[3,2-b]benzofuran - 2 - carboxylic acid of the formula:

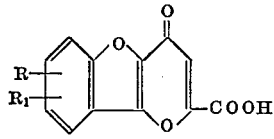

wherein R and $R_1$ are each selected from the group consisting of hydrogen, chloro, fluoro, trifluoromethyl, loweralkoxy of 1 to 3 carbon atoms, inclusive, and lower alkyl of 1 to 3 carbon atoms, inclusive, which comprises:

(1) reacting a compound of the formula:

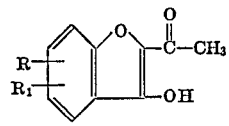

wherein R and $R_1$ have the meanings given, above with a dialkyl oxylate of the formula:

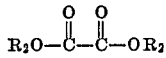

wherein $R_2$ is alkyl of 1 to 6 carbon atoms, inclusive, in the presence of an alkali metal alkoxide to obtain the corresponding alkali metal salt of an enol acylate of the formula:

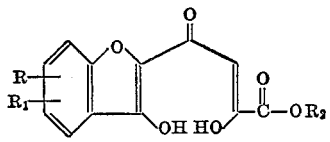

wherein $R_2$ has the meaning given, above;

(2) treating the enol acylate thus obtained with a mineral acid to obtain the corresponding alkyl 4-oxo-4H-pyrano[3,2-b]benzofuran - 2 - carboxylate of the formula:

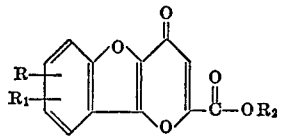

wherein R, $R_1$ and $R_2$ have the meanings given, above, and (3) subjecting the carboxylate thus obtained to hydrolysis with a mineral acid to obtain the corresponding 4 - oxo - 4H - pyrano[3,2-b]benzofuran - 2 - carboxylic acid.

18. The process of claim 17 for the production of 4-oxo - 4H - pyrano[3,2-b]benzofuran - 2 - carboxylic acid, wherein the starting material is 3 - hydroxy - 2 - benzofuranyl methyl ketone.

19. The process of claim 17 for the production of 7-chloro - 4H - pyrano[3,2-b]benzofuran - 2 -carboxylic acid, wherein the starting material is 5 - chloro - 3 - hydroxy-2-benzofuranyl methyl ketone.

No references cited.

NORMA S. MILESTONE, Primary Examiner

U.S. Cl. X.R.

260—346.2, 268 PC, 473 R, 521 R, 521 A; 424—283

UNITED STATES PATENT OFFICE
CERTIFICATE OF CORRECTION

Patent No. 3,816,467  Dated June 11, 1974

Inventor(s) John B. Wright

It is certified that error appears in the above-identified patent and that said Letters Patent are hereby corrected as shown below:

Column 18, lines 74-75, Claim 16, "5-chloro-3-benzofuranyl" should read -- 5-chloro-3-hydroxy-2-benzofuranyl --.

Signed and Sealed this second Day of August 1977

[SEAL]

Attest:

RUTH C. MASON
*Attesting Officer*

C. MARSHALL DANN
*Commissioner of Patents and Trademarks*